March 31, 1959 H. H. VANDERZEE 2,880,003

MAGNETIC SELECTOR

Filed May 3, 1955 2 Sheets-Sheet 1

INVENTOR.
H. H. Vanderzee
BY
L. F. Hammond
Atty.

March 31, 1959 H. H. VANDERZEE 2,880,003

MAGNETIC SELECTOR

Filed May 3, 1955 2 Sheets-Sheet 2

INVENTOR.
H. H. Vanderzee
BY
L. F. Hammand Atty.

2,880,003
Patented Mar. 31, 1959

2,880,003

MAGNETIC SELECTOR

Harry Herbert Vanderzee, Grand Rapids, Mich., assignor to AMI Incorporated, Grand Rapids, Mich., a corporation of Delaware Application May 3, 1955, Serial No. 505,655

7 Claims. (Cl. 274—10)

This invention relates to selector mechanisms and particularly to selecting devices adapted for use in connection with the record changers of automatic phonographs.

Ordinarily, phonographic record changers are provided with a selecting mechanism having a series of shiftable selector levers or pins, so arranged that one of the pins is displaced whenever a selection is made. Conventionally, these levers or pins are returned to their original positions by mechanical cancelling levers or plungers, as the selected records are played. Obviously this results in a mechanism having a large number of movable parts, particularly in the types of automatic phonographs now most popular commercially, wherein the record changers are usually adapted to handle a very large number of records.

It is therefore the primary object of the present invention to provide a selector for a record changing mechanism wherein no shiftable selector members are used, and wherein the cancellation of selections is accomplished by electrical means wherein no moving parts are required. Mechanical failures and service difficulties arising from the multitude of moving parts in conventional selectors are thus largely eliminated, and the mechanism is simplified.

The present invention provides a selector mechanism wherein a series of magnetically retentive slugs are employed as the selecting elements. These slugs are each individual to one of the recordings in the record magazine of the machine, and the mechanism includes electromagnetic coils for imparting a magnetic charge selectively to one of said slugs whenever a selection is made. Magnetic means are provided for instituting operation of the record player whenever any selection is made, and for continuing its operation until all selected records have been played. The operation of the record changer of the mechanism is also controlled magnetically, in accordance with the magnetic condition of the selector slugs.

An illustrative form of the invention is disclosed in the attached drawings wherein, Figure 1 is a fragmental sectional elevation of an automatic phonograph mechanism of the type more fully described in Vanderzee et al. Patent No. 2,666,649. The view shows the manner in which a selector according to the present invention may be applied to a record changing mechanism;

Figures 1, 5:
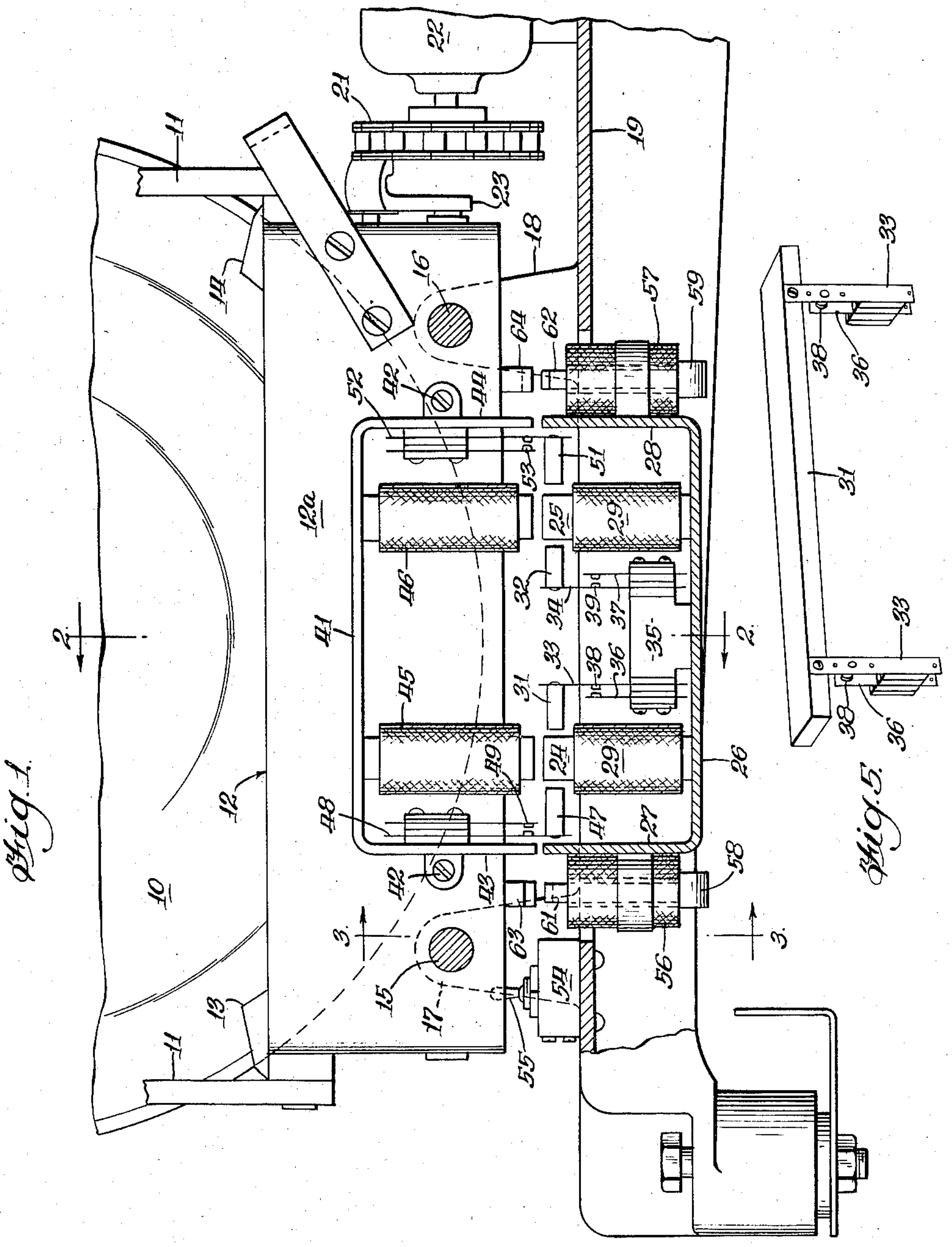
Figure 5 is a detail perspective view of a traverse motor control armature and its mounting contacts.
Figure 4:
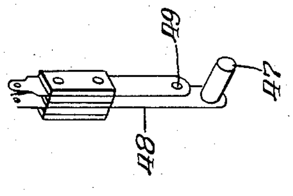
Figure 4 is a detail perspective view of a scanning armature employed in the construction illustrated.
Figure 2:
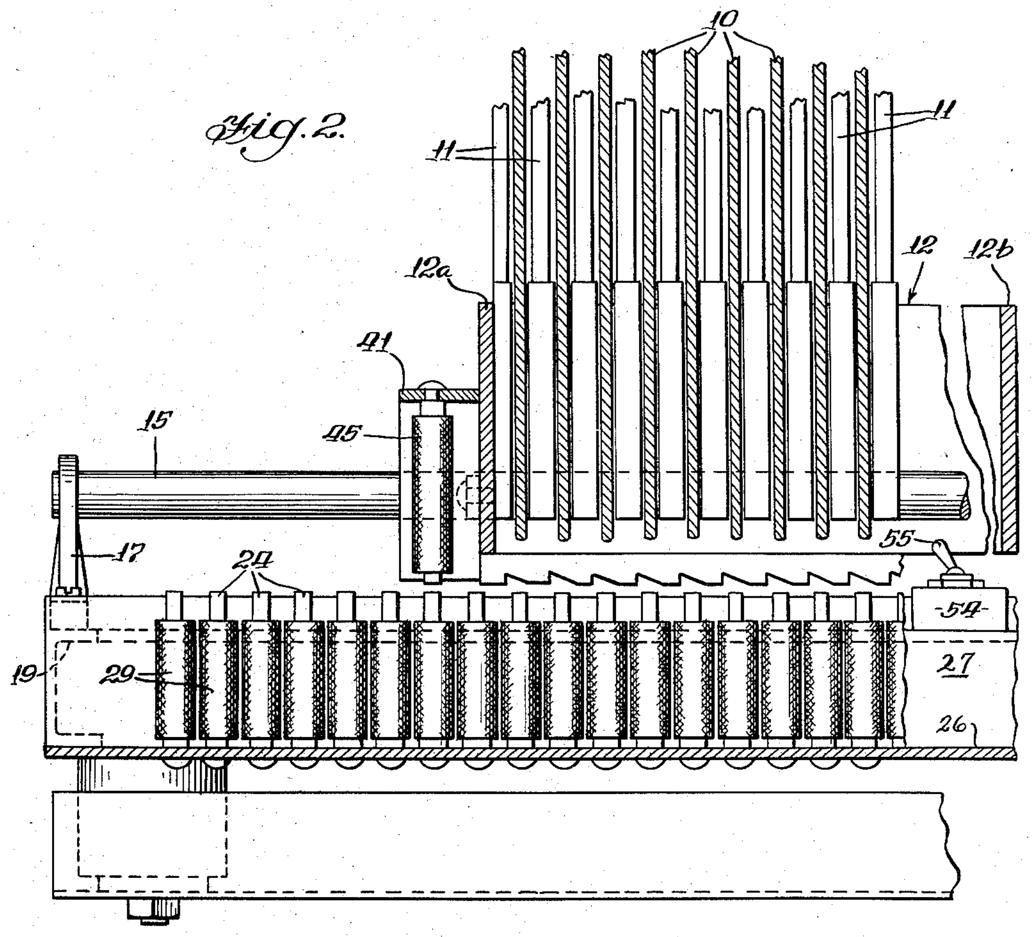
Figure 2 is a longitudinal transverse sectional view, substantially on the plane of the line 2—2 of Figure 1.

The selector illustrated in the drawings is a form of the invention particularly adapted for use in connection with record changers of the general type illustrated in my prior Patent No. 2,666,649 and Figures 1 and 2 of the present drawings are roughly comparable to Figures 14 and 15 of that patent.

As explained in the prior patent, the individual phonograph records 10 are mounted in vertical face to face relationship in a record rack or magazine mounted on a carriage 12. As shown, the records are arranged between spacers 11, with their lower edge resting on supporting blocks 13 and 14. The entire carriage structure is arranged to slide back and forth on a pair of slide rods 15 and 16, mounted on brackets 17 and 18 on the base plate 19. As in my prior patent, the carriage is caused to reciprocate on the slide rods 15, 16 by an endless chain 21 driven by a traverse motor 22. The chain 21 is coupled to the carriage 12 by a link 23. A record transfer arm (not shown) is also provided to lift any one of the records from the magazine and to place it on the turn table, whenever the magazine is brought to a stop with the selected record in alignment with the transfer arm.

According to the present invention a multiplicity of magnetic slugs 24, 25 are mounted on a U shaped selector frame having a bottom portion 26 and upwardly extending side walls 27 and 28. Preferably, each of the magnetic slugs 24, 25 is provided with an individual electromagnetic winding 29 so that whenever any one of the windings is momentarily energized the slug within it will be magnetized. The slugs 24, 25 are of magnetically retentive material, however, so that once magnetized they maintain their magnetic charge.

A pair of armatures 31, 32 are provided with contacts adapted to start the traverse motor 22 of the mechanism whenever any one of the slugs 24, 25 is magnetized. These armatures comprise elongated bars (Figure 5) mounted on spaced apart leaf springs, 33, 34 supported on an insulating block 35 between the two rows of magnetic slugs 24, 25. Each of the springs 33, 34 has a coacting leaf spring 36, 37 and a pair of electric contacts 38, 39. Thus, the bar armatures are yieldably held in positions wherein the bar 31 lies alongside the entire group of slugs 24, while the bar 32 lies alongside all of the slugs 25. It follows that whenever any one of the slugs 24, 25 is energized, one of the bar armatures will be drawn toward it, thus closing contacts 38 or 39. Those contacts are in parallel, and serve initiate movement of the record playing mechanism in the same way that the mechanism of my earlier patent is controlled by the bail switch 123. When the record player is energized, the carriage 12 will be moved back and forth along the rods 15 and 16 by the traverse motor 22, acting through the chain 21 and link 23. The carriage will thus travel longitudinally across the upper ends of both rows of slugs 24, 25.

A scanning yoke 41 is mounted on the end plate **12*a* of the carriage 12 by a pair of screws 42. This yoke is of inverted U shape with legs 43 and 44 in alignment with and spaced close to the upper edges of the walls 27 and 28 of the selector channel 26. The scanning yoke 41 carries a pair of cancelling magnets 45 and 46. These each consist of an electromagnetic 16 winding around a soft iron core, so positioned that the lower ends of the cores may pass directly over the slugs 24, 25 in close proximity to their upper ends. The scanning yoke is also provided with a pair of scanning armatures and electrical contacts actuated thereby. A scanning armature 47 of magnetical permeable material is accordingly mounted on the lower end of spring 48, which is carried on the leg 43 of the yoke. Contacts 49 on the spring 48 serve to close a circuit with an adjacent leaf spring whenever the armature 47 is attracted toward one of the selector slugs 24. A similar but opposite scanning armature 51 is mounted on a spring 52 affixed to the leg 44 of the yoke, and contacts 53 are arranged to close an electrical circuit to an adjacent spring whenever the armature 51** passes a slug having a magnetic charge.

As heretofore stated the armatures 47 and 51 are positioned so that they each move in close proximity to the upper ends of one of the rows of slugs 24, 25 as the carriage of the machine reciprocates. Thus when either of the scanning armatures 47 or 51 reaches a slug which has been magnetized, the armature will be drawn toward the slug, and the contacts 49 or 53 on the armature spring will close. This will result in bringing the magazine to a stop with the selected record in a position of registry with the record transfer arm of the machine, as explained in my earlier patent.

It will be understood, of course, that since each of the records in the magazine has a recording on each side, there will be two slugs associated with each record. For example, one of the slugs 24 will correspond to the recording on the face side of the record, while one of the slugs 25 corresponds to the recording on the reverse side. However, the positioning of the magazine carriage should be the same in either case, to insure precise registry of the record with the record transfer mechanism. A switching arrangement is accordingly provided so that the scanning armature 47 is effective only when the magazine is moving in one direction of travel, while the scanning armature 51 is effective only during travel of the magazine in the opposite direction. A switching arrangement is also provided on the transfer arm as in my earlier patent, so that the front face of a selected record is played if the carriage moves into selection position from one direction, while the back face is played if it moves to position from the opposite direction. To this end, only one set of control contacts are energized at one time. For example the contacts 49 on the scanning armature 47 are energized in one direction of travel of the carriage, while the armature 51 and contacts 53 are energized when the travel is in the opposite direction. This is accomplished by a toggle switch 54 mounted on the base plate but having its handle portion 55 extending upwardly between the end plates **12*a* and 12*b*** of the magazine (Figure 2) so that the switch is moved to the right at one extremity of travel of the magazine and moved back to the left at the other extremity of travel.

Figure 3:
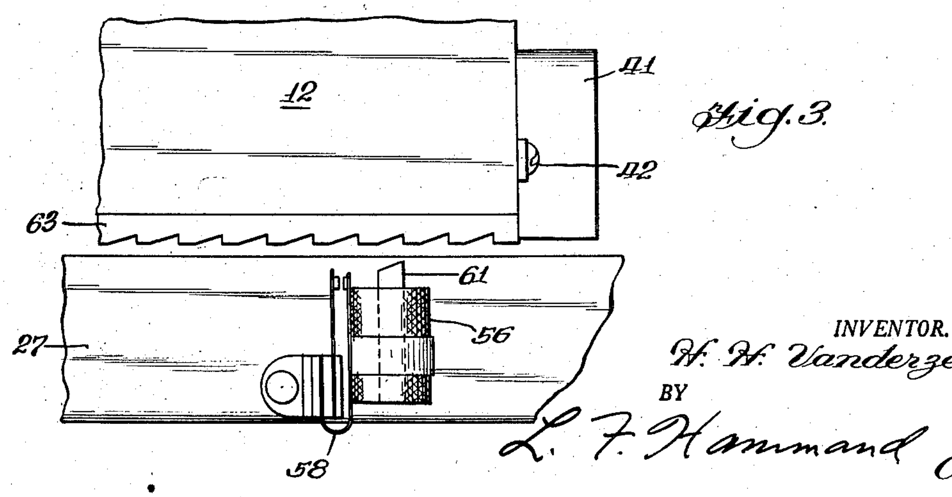
Figure 3 is a fragmental view of a record rack positioning mechanism which may be employed with the present invention; the view being taken at the point indicated by the line 3—3 of Figure 1.

If desired, the mechanism may be provided with the precision locating mechanism illustrated in Figure 3. With this arrangement the control contacts 49 and 52 do not directly control the traverse motor 22 of the mechanism. Instead, the circuit from each of the scanning contacts operate through a positioning circuit, including a solenoid and rack. Separate positioning mechanisms are provided for the two opposite directions of movement of the magazine. Thus there are two solenoids, 56 and 57, each mounted on a shiftable mounting spring 58, 59 (Figure 3) with the plungers 61, 62 of the solenoids arranged to move upwardly and engage ratchet bars 63, 64. The ratchet bars are oppositely notched at positions corresponding to the precise spacing between the individual records in the magazine. When either solenoid is energized, the pointed tip of its plunger will move upwardly where it will be engaged by a moving tooth of the ratchet bar. The continued motion of the ratchet bar will thus open the electrical contacts 65 at the precise instant required to stop the magazine with the record transfer arm in exact registry with the selected record. The transfer arm of the mechanism (not shown) is then caused to lift the selected record from the magazine to the turntable, as in my prior patent.

When the selection has been made, it is essential to cancel the magnetic charge in the selector slug. This is accomplished by momentarily energizing one of the de-magnetizing coils 45, 46 while its soft iron core is in alignment with the slug corresponding to the selected record. If desired, the de-magnetizing coil may be subjected to a high frequency alternating current flux of diminishing strength so that the selector slug is effectively de-magnetized, or it may be momentarily energized with direct current in a direction to magnetize its core with a magnetic field of opposite polarity to the charge held by the selector slug. In either case, of course, the flux path from the de-magnetizing windings through the selector slugs is completed through the soft iron of the selector channel and scanning yoke.

From the foregoing, it will be seen that the present invention provides a simple yet effective selecting mechanism, employing a minimum of moving parts. Thus the service and maintenance problems encountered in automatic phonographs having the multitude of individual shiftable selector levers heretofore customarily employed are wholly eliminated. Moreover, the scanning operation of the present selector is accomplished by mechanism wherein the only movement is the slight flexing of the armature mounting springs and contacts. It is also to be observed that the selections, when played, are cancelled without need of movable parts as conventionally employed in such mechanisms.

Having thus described the invention, what I claim as new and desire to protect by United States Letters Patent is:

1. A selector mechanism for an automatic phonograph having a record magazine adapted to hold a multiplicity of records, a record transfer mechanism adapted to move any selected record from the magazine to the record player, and a record player for reproducing sound from said record, with the magazine and transfer mechanism relatively movable with respect to each other whereby any record of the magazine may be brought to a position of registry with the transfer mechanism; said selector comprising, in combination, a multiplicity of magnetically retentive selector slugs, each individual to one of the recordings available in the mechanism of the phonograph; means to selectively magnetize said slugs; a scanning armature common to a plurality of said slugs and shiftable with respect thereto along a path of motion in close proximity thereto; with means responsive to the influence of the magnetic charge of said slugs on said armature to interrupt the relative movement between the transfer arm and the records in the magazine and to control the operation of the record transfer mechanism and record player.

2. A selector mechanism for an automatic phonograph having a record magazine adapted to hold a multiplicity of records, a record transfer mechanism adapted to move any selected record from the magazine to the record player, and a record player for reproducing sound from said record, with the magazine and transfer mechanism relatively movable with respect to each other whereby any record of the magazine may be brought to a position of registry with the transfer mechanism; said selector comprising in combination, a multiplicity of magnetically retentive selector slugs, each individual to one of the recordings available in the mechanism of the phonograph; means to selectively magnetize said slugs; a scanning armature common to a plurality of said lugs and shiftable with respect thereto along a path of motion in close proximity thereto; with means responsive to the influence of the magnetic charge of said slugs on said armature to interrupt the relative movement between the transfer arm and the records in the magazine and to control the operation of the record transfer mechanism and record player and means to selectively demagnetize said selector slugs.

3. A selector mechanism for an automatic phonograph having a record magazine adapted to hold a multiplicity of records, a record transfer mechanism adapted to move any selected record from the magazine to the record player, and a record player for reproducing sound from said record, with the magazine and transfer mechanism relatively movable with respect to each other whereby any record of the magazine may be brought to a position of registry with the transfer mechanism; said selector comprising, in combination, a multiplicity of magnetically retentive selector slugs, each individual to one of the recordings available in the mechanism of the phonograph; said magnetically retentive slugs each consisting of a metallic core with an electromatic winding surrounding the core and adapted to be selectively energized by exterior electric means; a scanning armature common to a plurality of said slugs and shiftable with respect thereto along a path of motion in close proximity thereto; with means responsive to the magnetic charge of one of said slugs when said armature moves into the magnetic field thereof to interrupt the relative movement between the transfer mechanism and the records in the magazine and to control the operation of the record transfer mechanism and record player.

4. A selector mechanism for an automatic phonograph having a record magazine adapted to hold a multiplicity of records, a record transfer mechanism adapted to move any selected record from the magazine to the record player, and a record player for reproducing sound from said record, with the magazine and transfer mechanism relatively movable with respect to each other whereby any record of the magazine may be brought to a position of registry with the transfer mechanism; said selector comprising, in combination, a multiplicity of magnetically retentive selector slugs, each individual to one of the recordings available in the mechanism of the phonograph; said magnetically retentive slugs each consisting of a metallic core with an electromatic winding surrounding the core and adapted to be selectively energized by exterior electric means; said slugs being arranged in spaced apart alignment in a common plane with each other, with the spacing between the individual slugs corresponding to the spacing between the records available in the magazine of the phonograph; a scanning armature common to a plurality of said slugs and shiftable with respect thereto along a path of motion in close proximity thereto; with means responsive to the magnetic charge of one of said slugs when said armature moves into the magnetic field thereof to interrupt the relative movement between the transfer mechanism and the records in the magazine and to control the operation of the record transfer mechanism and record player.

5. A selector mechanism for an automatic phonograph having a record magazine adapted to hold a multiplicity of records, a record transfer mechanism adapted to move any selected record from the magazine to the record player, and a record player for reproducing sound from said record, with the magazine and transfer mechanism relatively movable with respect to each other whereby any record of the magazine may be brought to a position of registry with the transfer mechanism; said selector comprising, in combination, a multplicity of magnetically retentive selector slugs, each individual to one of the recordings available in the mechanism of the phonograph; said magnetically retentive slugs each consisting of a metallic core with an electromatic winding surrounding the core and adapted to be selectively energized by exterior electric means; a scanning armature common to a plurality of said slugs and shiftable with respect thereto along a path of motion in close proximity thereto; with means responsive to the magnetic charge of one of said slugs when said armature moves into the magnetic field thereof to interrupt the relative movement between the transfer mechanism and the records in the magazine and to control the operation of the record transfer mechanism and record player and electromagnetic means to selectively demagnetize any one of said slugs.

6. A selector mechanism for an automatic phonograph having a record magazine adapted to hold a multiplicity of records, a record transfer mechanism adapted to move any selected record from the magazine to the record player, and a record player for reproducing sound from said record, with the magazine and transfer mechanism relatively movable with respect to each other whereby any record of the magazine may be brought to a position of registry with the transfer mechanism; said selector comprising, in combination, a multiplicity of magnetically retentive selector slugs, each individual to one of the recordings available in the mechanism of the phonograph; said magnetically retentive slugs each consisting of a metallic core with an electromatic winding surrounding the core and adapted to be selectively energized by exterior electric means; said slugs being arranged in spaced apart alignment in a common plane with each other, with the spacing between the individual slugs corresponding to the spacing between the records available in the magazine of the phonograph; a scanning armature common to a plurality of said slugs and shiftable with respect thereto along a path of motion in close proximity thereto; with means responsive to the magnetic charge of one of said slugs when said armature moves into the magnetic field thereof to interrupt the relative movement between the transfer mechanism and the records in the magazine and to control the operation of the record transfer mechanism and record player and electromagnetic means to selectively demagnetize any one of said slugs.

7. A selector mechanism for an automatic phonograph having a record magazine adapted to hold a multiplicity of records, a record transfer mechanism adapted to move any selected record from the magazine to the record player, and a record player for reproducing sound from said record, with the magazine and transfer mechanism relatively movable with respect to each other whereby any record of the magazine may be brought to a position of registry with the transfer mechanism; said selector comprising, in combination, a multiplicity of magnetically retentive selector slugs, each individual to one of the recordings available in the mechanism of the phonograph; means to selectively magnetize said slugs; a scanning armature common to a plurality of said slugs and shiftable with respect thereto along a path of motion in close proximity thereto; with means responsive to the magnetic charge of one of said slugs and effective when said armature moves into the magnetic field thereof to interrupt the relative movement between the transfer mechanism and the records in the magazine and to control the operation of the record transfer mechanism and record player.

References Cited in the file of this patent

UNITED STATES PATENTS

2,666,649 Vanderzee et al. ---------- Jan. 19, 1954